(12) United States Patent
Watson

(10) Patent No.: US 7,391,909 B2
(45) Date of Patent: Jun. 24, 2008

(54) DATA MANIPULATION

(75) Inventor: Victor Robert Watson, Itchen (GB)

(73) Assignee: STMicroelectronics Limited, Almondsbury Bristol (GB)

( * ) Notice: Subject to any disclaimer, the term of this patent is extended or adjusted under 35 U.S.C. 154(b) by 600 days.

(21) Appl. No.: 10/159,954

(22) Filed: May 31, 2002
(Under 37 CFR 1.47)

(65) Prior Publication Data

US 2003/0161397 A1    Aug. 28, 2003

Related U.S. Application Data

(63) Continuation of application No. 10/014,881, filed on Dec. 11, 2001, now abandoned, which is a continuation of application No. 09/883,857, filed on Jun. 18, 2001, now abandoned, which is a continuation of application No. 09/669,080, filed on Sep. 25, 2000, now abandoned, which is a continuation of application No. 09/488,306, filed on Jan. 20, 2000, now abandoned, which is a continuation of application No. 09/339,276, filed on Jun. 23, 1999, now abandoned, which is a continuation of application No. 09/207,732, filed on Dec. 8, 1998, now abandoned.

(30) Foreign Application Priority Data

Dec. 29, 1997    (GB) ................................ 9727399.9

(51) Int. Cl.
*G06K 9/36* (2006.01)
(52) U.S. Cl. ..................... 382/232; 382/246; 382/251
(58) Field of Classification Search ................ 382/232, 382/237, 244–248, 251; 341/59, 63, 67
See application file for complete search history.

(56) References Cited

U.S. PATENT DOCUMENTS

| 3,810,112 | A | | 5/1974 | Aho et al. |
| 5,956,755 | A | * | 9/1999 | Kanie et al. ............. 711/206 |
| 6,028,636 | A | * | 2/2000 | Matsui et al. ......... 375/240.18 |

(Continued)

FOREIGN PATENT DOCUMENTS

EP    0 568 046    11/1993

(Continued)

OTHER PUBLICATIONS

Standard Search Report dated Mar. 18, 1998, issued by the European Patent Office.

(Continued)

*Primary Examiner*—Duy M Dang
(74) *Attorney, Agent, or Firm*—Lisa K. Jorgenson; James H. Morris; Wolf, Greenfield & Sacks, P.C.

(57) ABSTRACT

A method for performing a reordering operation on a matrix of input data values, the method comprising: loading the data values into a computer store by forming a plurality of data strings, each data string comprising a plurality of data sub-strings and each data sub-string representing at least one of the data values, and storing each data string in a register of the computer store in which its sub-strings are not individually addressable; and performing a series of data reordering steps operating on one or more of said data strings to reorder said data values; the reordering operation being a scan-wise reordering operation.

28 Claims, 13 Drawing Sheets

U.S. PATENT DOCUMENTS 6,091,856 A * 7/2000 Terane et al. ................ 382/246

FOREIGN PATENT DOCUMENTS

| EP | 0 743 594 | 11/1996 |
|---|---|---|
| EP | 0 757 312 | 2/1997 |
| WO | WO 94/27211 | 11/1994 |

OTHER PUBLICATIONS

Ruby Lee, *Subword Parallelism with Max-2*, IEEE Micro, vol. 16, No. 4, Aug. 1, 1996, pp. 51-59, XP000596513.

Linley Gwennap, *UltraSparc Adds Multimedia Instructions*, Microprocessor Report, Dec. 5, 1994, pp. 16-18 XP000561690.

Alex Peleg et al., *MMX Technology Extension to the Intel Architecture*, IEEE Micro, vol. 16, No. 4, Aug. 1, 1996, pp. 42-50 XP000596512.

* cited by examiner

PROCESSOR & MEMORY

PACKED UNIT

OBVIOUS PACKED ARITHMETIC

FIG. 8
SYMBOLS

| SYMBOL | OPERATION |
|---|---|
| ▽ | ARITHMETIC LOGIC UNIT. COMBINES THE TWO SOURCE VALUES IN SOME MANNER TO PRODUCE A RESULT. |
| → \| R[3] \| R[2] \| R[1] \| R[0] \| → → → → ↑ | BUFFER. THIS PARTICULAR ONE HAS AN INPUT WHICH IS UNSEPARATED AND FOUR SEPARATED OUTPUTS, EACH TAKING ONE QUARTER OF THE INPUT SIGNALS, IT ALSO HAS AN OUTPUT ENABLE INPUT. |
| (multiplexer symbol) | MULTIPLEXER. THE OUTPUT CONSISTS OF ONE OF THE TWO INPUT SIGNALS. WHEN THE CONTROL SIGNAL IS NOT ASSERTED, THE UNSHADED INPUT SIGNAL IS OUTPUT. WHEN THE CONTROL SIGNAL IS ASSERTED, THE SHADED INPUT SIGNAL IS OUTPUT. |
| (changeover switch symbol) | CHANGEOVER SWITCH. EACH OF THE TWO OUTPUTS CONSISTS OF ONE OF THE INPUT SIGNALS. WHEN THE CONTROL SIGNAL IS NOT ASSERTED, THE UNSHADED INPUT GOES TO THE UNSHADED OUTPUT AND THE SHADED INPUT GOES TO THE SHADED OUTPUT. WHEN THE CONTROL SIGNAL IS ASSERTED, THE OUTPUTS SWAP OVER. |

OBVIOUS PACKED ARITHMETIC WITH UNPACKED OPERAND

BYTE REPLICATE

FIG. 11
ZIP AND UNZIP

FLIP

64-BIT ZIPS AND UNZIPS

DOUBLE LENGTH 8-BIT ZIP AN UNZIP

DOUBLE LENGTH 16-BIT AND 32-BIT ZIP AN UNZIP

8-BIT FLIPS

16-BIT AND 32-BIT FLIPS

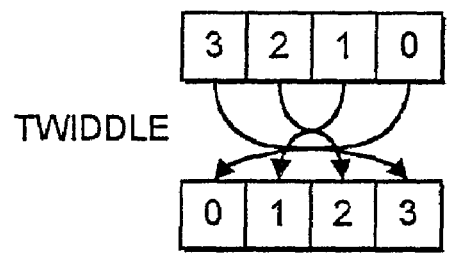
FIG. 18
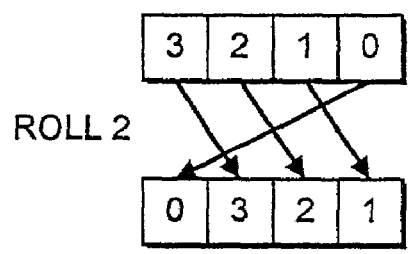
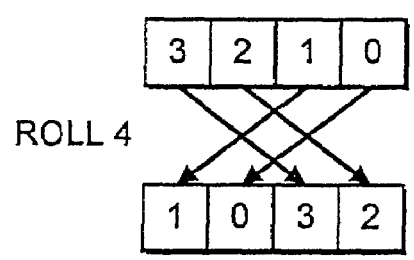
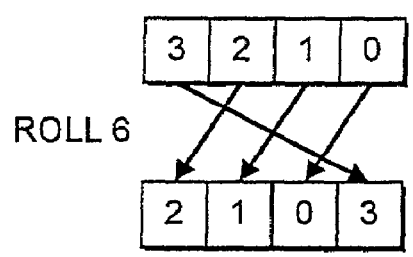
FIG. 19

|     | 401 |   |   |   |   |   |   |   | 402 |
|-----|-----|---|---|---|---|---|---|---|-----|
| R0  | 3 | 2 | 1 | 0 | 7 | 6 | 5 | 4 | R1 |
| R2  | 11 | 10 | 9 | 8 | 15 | 14 | 13 | 12 | R3 |
| R4  | 19 | 18 | 17 | 16 | 23 | 22 | 21 | 20 | R5 |
| R6  | 27 | 26 | 25 | 24 | 31 | 30 | 29 | 28 | R7 |
| R8  | 35 | 34 | 33 | 32 | 39 | 38 | 37 | 36 | R9 |
| R10 | 43 | 42 | 41 | 40 | 47 | 46 | 45 | 44 | R11 |
| R12 | 51 | 50 | 49 | 48 | 55 | 54 | 53 | 52 | R13 |
| R14 | 59 | 58 | 57 | 56 | 63 | 62 | 61 | 60 | R15 |
|     | 400 |   |   |   |   |   |   |   |     |
|-----|---|---|---|---|----|----|----|----|-----|
| R0  | 6 | 5 | 1 | 0 | 28 | 27 | 15 | 14 | R1 |
| R2  | 13 | 7 | 4 | 2 | 42 | 29 | 26 | 16 | R3 |
| R4  | 17 | 12 | 8 | 3 | 43 | 41 | 30 | 25 | R5 |
| R6  | 24 | 18 | 11 | 9 | 53 | 44 | 40 | 31 | R7 |
| R8  | 32 | 23 | 19 | 10 | 54 | 52 | 45 | 39 | R9 |
| R10 | 38 | 33 | 22 | 20 | 60 | 55 | 51 | 46 | R11 |
| R12 | 47 | 37 | 34 | 21 | 61 | 59 | 56 | 50 | R13 |
| R14 | 49 | 48 | 36 | 35 | 63 | 62 | 58 | 57 | R15 |
FIG. 20
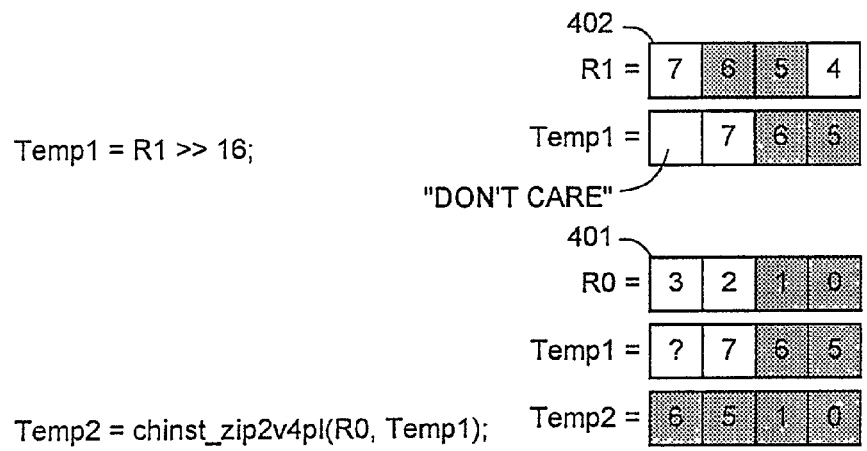
FIG. 21
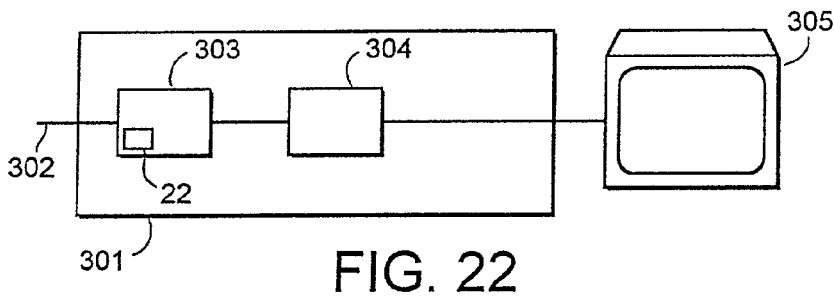
FIG. 22

DATA MANIPULATION

This application is a continuation of prior application Ser. No. 10/014,881, filed Dec. 11, 2001 (Now Abandoned), which in turn is a continuation of application Ser. No. 09/883,857 (Now Abandoned), filed Jun. 18, 2001 (Now Abandoned), which in turn is a continuation of application Ser. No. 09/669,080 (Now Abandoned), filed Sep. 25, 2000, which in turn is a continuation of application Ser. No. 09/488,306 (Now Abandoned), filed Jan. 20, 2000, which in turn is a continuation of application Ser. No. 09/339,276 (Now Abandoned), filed Jun. 23, 1999, which in turn is a continuation of application Ser. No. 09/207,732 (Now Abandoned), filed Dec. 8, 1999, entitled DATA MANIPULATION

BACKGROUND OF THE INVENTION

This invention relates to manipulating data, for example for encoding or decoding digital video signals.

It is becoming increasingly common for video signals to be transmitted or stored in a digital, rather than an analogue, format. Digital video signals are usually compressed before transmission or storage (using a standard compression system such as MPEG-2, H.261 or H.263) and decompressed before playback. Several video compression standards use block-format video encoding, in which the pixels of the image to be compressed are split into blocks of adjacent pixels and each block is then compressed by a series of steps. This is efficient because most naturally-occurring images have areas which look fairly uniform and when compressing the image in this way the local uniformity reduces the amount of data needed to describe the image.

The first step of a typical block-format compression process is to split the image into smaller component blocks of adjacent pixels. Typically, the image is split into macroblocks (MBs), which consist of 256 pixels in a 16×16 array. The image in a macroblock is characterised by a luminance value (Y) for each pixel and two chrominance values (U and V) which in what is known as the 4:2:0 format (as used in many video compression standards), are each in an 8×8 array. Thus in this format each chrominance sampling point covers four luminance pixels (see FIG. 1). The main purpose of splitting the image in this way is to make the job of spatial compression easier; only a small section of the image needs to be examined, and so the task—although less efficient—is less complicated.

The usual technique used next is a discrete cosine transform (DCT). This works in much the same way as the Fourier transform, but in two dimensions on a set of pixels. Each coefficient in the DCT output represents a wave in the pixel domain, with the amplitude determined by the value of the coefficient, and the frequency in both dimensions determined by the position in the coefficient matrix. Moving to the right or the bottom of the DCT coefficient matrix increases the frequency of this wave. A superposition of a number of these waves leads to a reconstruction of the original image.

At this point, compression can begin on each DCTed luminance and chrominance matrix by removing some of the coefficients from the matrix, and quantising others. This leads to inaccuracies in the reconstituted image (lossy compression) but this is often acceptable, and the resulting matrix is easier to compress since it contains less information.

Another refinement to the compression process is the use of run-length encoding. This is a useful way of compressing sparse matrices. The technique involves thinking of the matrix as a long string of data, much as would be the case in a computer's memory. Run-length encoding (RLE) then consists of describing that string as a number indicating the length of a series of zeroes, followed by a non-zero data element, followed by a number of zeroes, followed by a non-zero data element, and so on.

To improve compression yet further, these RLE strings are Huffman-encoded. Huffman encoding consists of expressing some data item as a symbol—in this case, the number of zeroes (the run-length) followed by the data item. Huffman encoding relies on previous knowledge of the probability of occurrence of a particular symbol, such that the most likely symbols are encoded with fewer bits than the original, whereas the least likely symbols are encoded with more bits than the original. With sufficient knowledge of the likely data set, the number of bits required to represent that set are reduced, since the most frequently occurring symbols are represented in a small number of bits.

The success of a Huffman encoder relies on the predictability of its input data. In the example of the block of DCT coefficients outlined above, a raster scanning mechanism does not give particularly predictable data since the values tend to cluster in the top-left corner of the matrix (the low-frequency area). Thus scanning the first few lines will tend to give a data burst, followed by a few zeroes, followed by a slightly shorter data burst, followed by a few more zeroes, and so on. It is more efficient to group the non-zero data together, leading to a more predictable run-length, and so better Huffman compression. This is achieved by zigzag scanning.

FIG. 2 shows the scanning route for a standard zigzag scan of an 8×8 pixel block. This can be used for the 8×8 U and V blocks of a macroblock and, by splitting the 16×16 luminance block into four 8×8 blocks, for the luminance data too. In this way, each macroblock can be represented by six 8×8 blocks (4 Y, one U, one V) in the 4:2:0 format. Clearly, other forms of scan, for instance unidirectional rather than bi-directional or at angles other than 45° could be used.

The zigzag scanned data is then Huffman encoded, so a simplified I-frame (spatial only) compression method could be summarised as the steps shown in FIG. 3.

In order to perform real-time video compression or decompression there is a need to perform these steps very quickly.

In practice, the zigzag encoding illustrated in FIG. 2 is performed by reading each element of the input matrix array, accessing a look-up table as illustrated in FIG. 4 to find the element's destination location in the output array and then storing the element at that location in the output array. Similar procedures are also used for other applications to reorder sets of data.

SUMMARY OF THE INVENTION

According to the present invention there is provided a method for performing a reordering operation on a matrix of input data values, the method comprising: loading the data values into a computer store by forming a plurality of data strings, each data string comprising a plurality of data sub-strings and each data sub-string representing at least one of the data values, and storing each data string in a register of the computer store in which its sub-strings are not individually addressable; and performing a series of data reordering steps operating on one or more of said data strings to reorder said data values; the reordering operation being a scan-wise reordering operation.

By performing reordering operations in this way it is possible that the need for a reordering look-up table can be reduced or even eliminated.

The data values and/or the data sub-strings may be reordered by manipulating the said data strings and/or registers (so that the reordered data sub-strings are contained in those same registers). Alternatively, the data reordering steps may result in the allocation of a second set of data strings in respective data registers, which suitably comprise the data values and/or the data sub-strings in reordered sequence.

Preferably the data reordering steps are performed by executing one or more data reordering instructions, suitably in a computer. The computer preferably has processing means, comprising one or more processors, and memory. The instructions are preferably capable of being executed by dedicated apparatus (software or hardware) in the computer. The instructions may include instructions to operate on two first data strings to form another data string in which adjacent sub-strings are equal to sub-strings of alternate ones of the first data strings; this is preferably an instructions of the zip or unzip type. The instructions may include instructions to operate on a first data string to form another data string containing the same objects as the first data string but in reverse order; this is preferably an instruction of the twiddle type. The instructions may include instructions to operate on a first data string to form another data string containing the same objects as the first data string but wrappingly shifted to the left or right; this is preferably an instruction of the roll type.

There may be one or more intermediate reordering steps to go from the input order of the data values to the output order required according to the scan-wise reordering operation. Preferably the intermediate steps produce a partially ordered output (suitably a data string in which some but not all of the sub-strings are reordered according to the scan-wise reordering operation) or a partially collected output (suitably a data string in which some but not all of the adjacent sub-strings are correctly adjacent according to the scan-wise reordering operation but are in the wrong order). The data values could be reordered according to any suitable scheme, for instance in a series of pairing and ordering stages. One or more data reordering steps or instructions preferably generates a data string in which two or more, all or some only of the sub-strings and/or the input data values which they contain are in order according to the scan-wise reordering operation. The said generated data string may be an output data string or an intermediate data string.

Any or all of the data strings preferably comprises at least two data sub-strings, suitably for storing at least one data value in each sub-string. The data strings are preferably of a predetermined length, for instance 32, 64 or 128 bits. The data-sub-strings in each data string are preferably of equal length, for instance 8, 16 or 32 bits.

Other operations may be performed during the execution of the method. These may include non-reordering operations and look-up table reordering operations. Preferably there are no look-up table reordering operations performed.

Preferably the matrix is an orthogonal matrix of data values, most preferably a square matrix of data values. Preferably the number of the data values is a square number (or, if several series of data values are to be reordered, a whole multiple of a square number).

Preferably the data values represent data to be compressed or decompressed. Preferably the data values represent data values to be decoded into a desired form, for example in a video decompression apparatus. Preferably the data values represent video data, for instance luminance or chrominance information. The video data could relate to moving or still images.

The scan-wise reordering operation preferably involves producing a series of output data values ordered according to a scan-wise pattern depending on their position in the input matrix. The scan preferably involves selecting adjacent data values in the matrix in order. The direction of the scan within the matrix preferably reverses periodically. The scan-wise reordering operation is preferably a zigzag or reverse zigzag operation. The scan is preferably a diagonal scan. The ordering operation is preferably part of a compression or decompression operation, for example video compression or decompression. Such compression or decompression is preferably as a precursor to Huffman encoding or the like or as a step following Huffman decoding or the like.

Some or all of the steps and/or instructions of the method are suitably performed by a computer, suitably according to a stored program. The computer may be part of a compression and/or decompression and/or decoding system, preferably for sampled data and/or video data. The computer may be part of a network communication unit such as a set-top box, a camera (especially a video camera) or a television or monitor.

BRIEF DESCRIPTION OF THE DRAWINGS

The present invention will now be described by way of example with reference to the accompanying drawings in which:

FIG. 8 is a block diagram of an obvious packed arithmetic unit operating on two packed source operands;

FIG. 11 shows zip and unzip restructuring operations;

FIG. 18 shows a twiddle operation;

FIG. 19 shows roll operations;

FIG. 20 shows register reordering in a zigzag operation on an 8×8 matrix;

FIG. 21 shows the formation of an output register in a forward zigzag operation; and FIG. 22 shows generally the architecture of a set-top box.

DESCRIPTION OF THE PREFERRED EMBODIMENT

Figure 5:
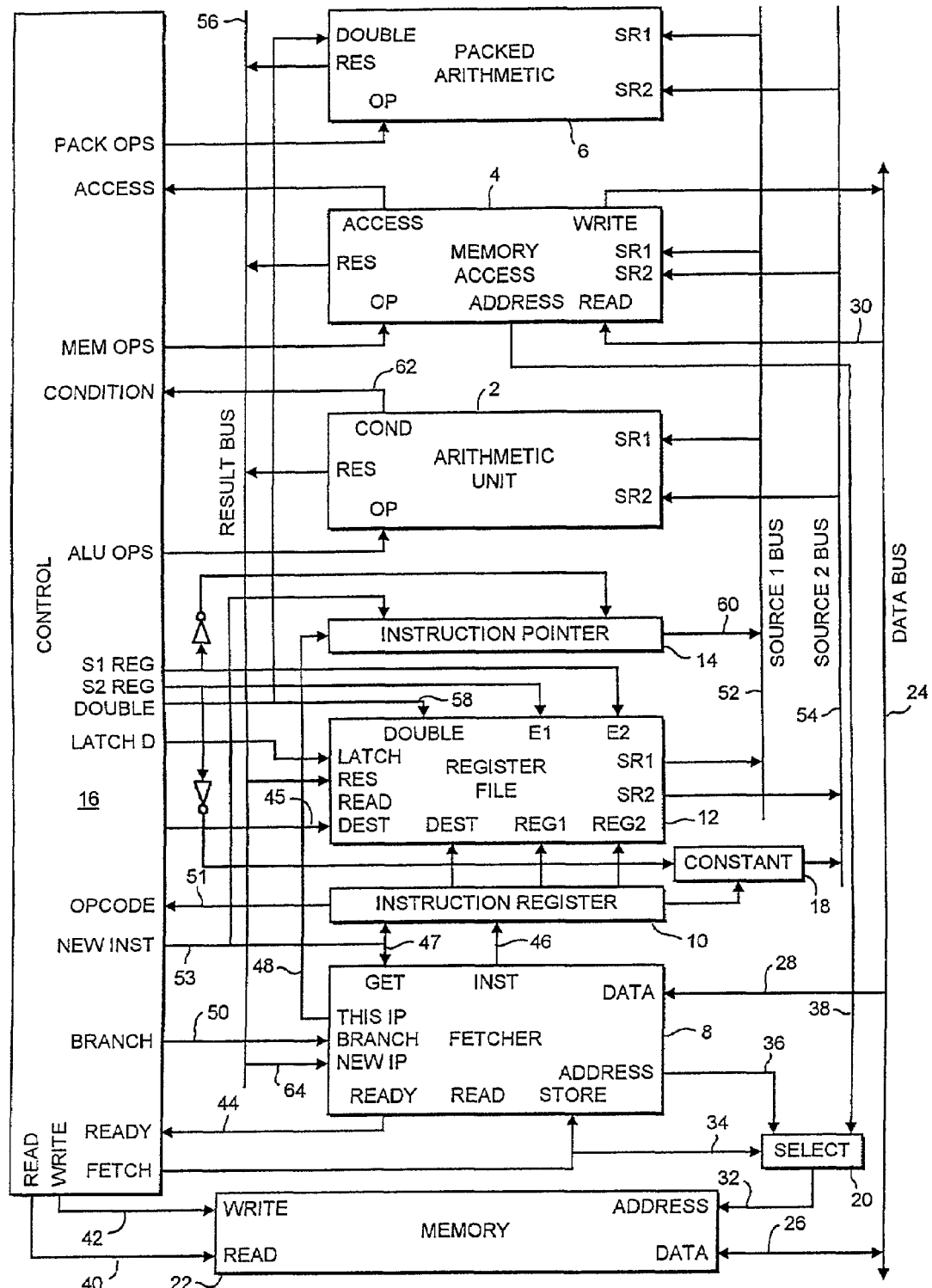
FIG. 5 is a block diagram of a processor and memory of a computer.

FIG. 5 shows a processor in accordance with one embodiment of the present invention. The processor has three execution units including a conventional arithmetic unit 2 and a memory access unit 4. In addition there is a packed arithmetic unit 6. The processor also includes an instruction fetcher 8, an instruction register 10, a register file 12 and an instruction pointer 14 all of which operate under the control of a control unit 16 of the processor. The register file comprises a set of registers each having a predetermined bit capacity and each being addressable with a single address. It is not possible to address individual locations within a register. When a register is accessed, the entire contents of the register are concerned. The processor further includes a constant unit 18 and a select unit 20. The constant unit 18 and select unit 20 are also operated under the control of the control unit 16. The processor operates in conjunction with a memory 22 which holds instructions and data values for effecting operations of the processor. Data values and instructions are supplied to and from the memory 22 via a data bus 24. The data bus 24 supplies data values to and from the memory 22 via a memory data input 26. The data bus 24 also supplies data to the instruction fetcher 8 via a fetcher data input 28 and to the memory access unit 4 via a memory access read input 30. The memory is addressed via the select unit 20 on address input 32. The select unit 20 is controlled via a fetch signal 34 from the control unit 16 to select an address 36 from the fetcher 8 or an address 38 from the memory access unit 4. Read and write control lines 40,42 from the control unit 16 control read and write operations to and from the memory 22. The instruction fetcher 8 fetches instructions from the memory 22 under the control of the control unit 16 as follows. An address 36 from which instructions are to be read is provided to the memory 22 via the select unit 20. These instructions are provided via the data bus 24 to the fetcher data input 28. When the instruction fetcher has fetched its next instruction, or in any event has a next instruction ready, it issues a Ready signal on line 44 to the control unit 16. The instruction which is to be executed is supplied to the instruction register 10 along instruction line Inst 46 and held there during its execution. The instruction pointer 14 holds the address of the instruction being executed supplied to it from the fetcher 8 via instruction pointer line 48. A Get signal 47 responsive to a New Inst signal 53 from the control unit 16 causes the instruction register 10 to store the next instruction on Inst line 46 and causes the fetcher 8 to prepare the next instruction. The New Inst signal 53 also causes the instruction pointer 14 to store the address of the next instruction. A branch line 50 from the control unit 16 allows the instruction fetcher 8 to execute branches.

The instruction register 10 provides Source 1 and Source 2 register addresses to the register file 12 as Reg1 and Reg2. A result register address is provided as Dest. Opcode is provided to the control unit 16 along line 51. In addition, some instructions will provide a constant operand instead of encoding one or both source registers. The constant is provided by the constant unit 18. The instruction's source values are provided on Source 1 and Source 2 buses 52,54 by the appropriate settings of the S1 Reg and S2 Reg signals at inputs E1,E2. The correct execution unit is enabled by providing the appropriate values for Pack Ops, Mem Ops and ALU Ops signals from the control unit 16 in accordance with the Opcode on line 51. The enabled unit will normally provide a result Res on a result bus 56. This is normally stored in the selected result register Dest in the register file 12. There are some exceptions to this.

Some instructions provide a Double length result. These store the first part of the result in the normal way. In a subsequent additional stage, the second part of the result is stored in the next register in the register file 12 by asserting a Double signal 58.

Branches 50 need to read and adjust the instruction pointer 14. These cause the S1 Reg signal not to be asserted, and so the instruction pointer 14 provides the Source 1 value on line 60. The Source 2 value is provided in the normal way (either from a register in the register file 12, or the constant unit 18). The arithmetic unit 2 executes the branch calculations and its result is stored into the fetcher 8 on the New IP input 64, rather than the register file 12, signalled by the Branch line 50 from the control unit 16. This starts the fetcher from a new address.

Conditional branches must execute in two stages depending on the state of condition line 62. The first stage uses the Dest Register as another source, by asserting a Read Dest signal 45. If the condition is satisfied, then the normal branch source operands are read and a branch is executed.

Calls must save a return address. This is done by storing the instruction pointer value in a destination register prior to calculating the branch target.

The computer described herein has several noteworthy general qualities.

Source operands are always the natural word length. There can be one, two or three source operands.

The result is always the natural word length, or twice the natural word length. There is a performance penalty when it is twice the natural word length as it takes an extra stage to store and occupies two, rather than one, registers. For this computer, assume a natural word length of 64 bits. That is, each register in the register file has a predetermined capacity of 64 bits.

The execution units 2,4,6 do not hold any state between instruction execution. Thus subsequent instructions are independent.

Non-Packed Instructions

The arithmetic unit 2 and memory access unit 4, along with the control unit 16 can execute the following instructions of a conventional instruction set. In the following definitions, a register is used to denote the contents of a register as well as a register itself as a storage location, in a manner familiar to a person skilled in the art.

| | |
|---|---|
| mov | Move a constant or a register into a register |
| add | Add two registers together and store the result in a third register (which could be the same as either of the sources) |
| sub | Subtract two registers and store the result in a third register |
| load | Use one register as an address and read from that location in memory, storing the result into another register |
| store | Use one register as an address and store the contents of another register into memory at the location specified by the address |
| cmpe | Compare two registers (or a register and a constant) for equality. If they are equal, store 1 into the destination register otherwise store zero |
| cmpge | Compare two registers (or a register and a constant) for orderability. If the second is not less than the first, store 1 into the destination register other wise store zero |
| jump | Unconditional jump to a new location |
| jumpz | Jump to a new program location, if the contents of a specified register is zero |
| jumpnz | Jump to a new program location, if the contents of a specified register is not zero |
| shr | Perform a bitwise right shift of a register by a constant or another register and store the result in a destination register. The shift is signed because the sign bit is duplicated when shifting |
| shl | Perform a bitwise left shift of a register by a constant or another register and store the result in a destination register |
| or/xor | Perform a bitwise logical operation (or/xor) on two registers and store result in destination register. |

Packed Unit

Figure 1:
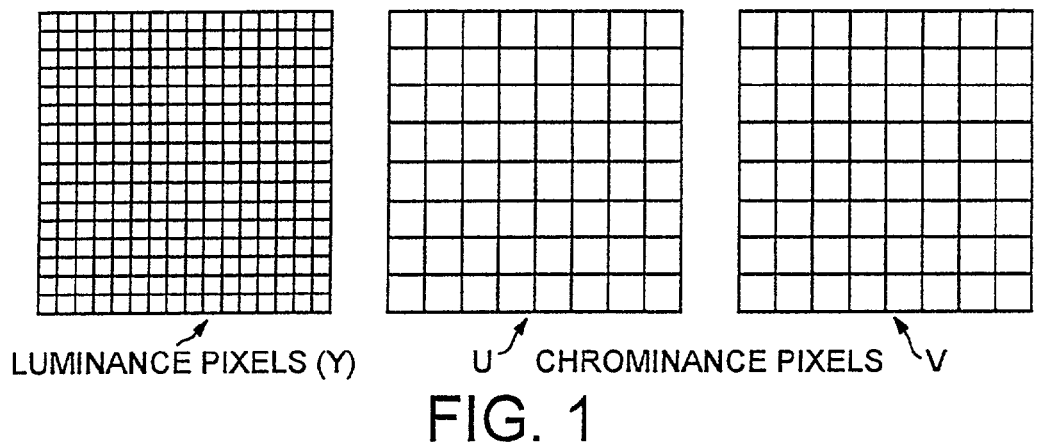
FIG. 1 illustrates an example of a macro-block.
Figure 6:
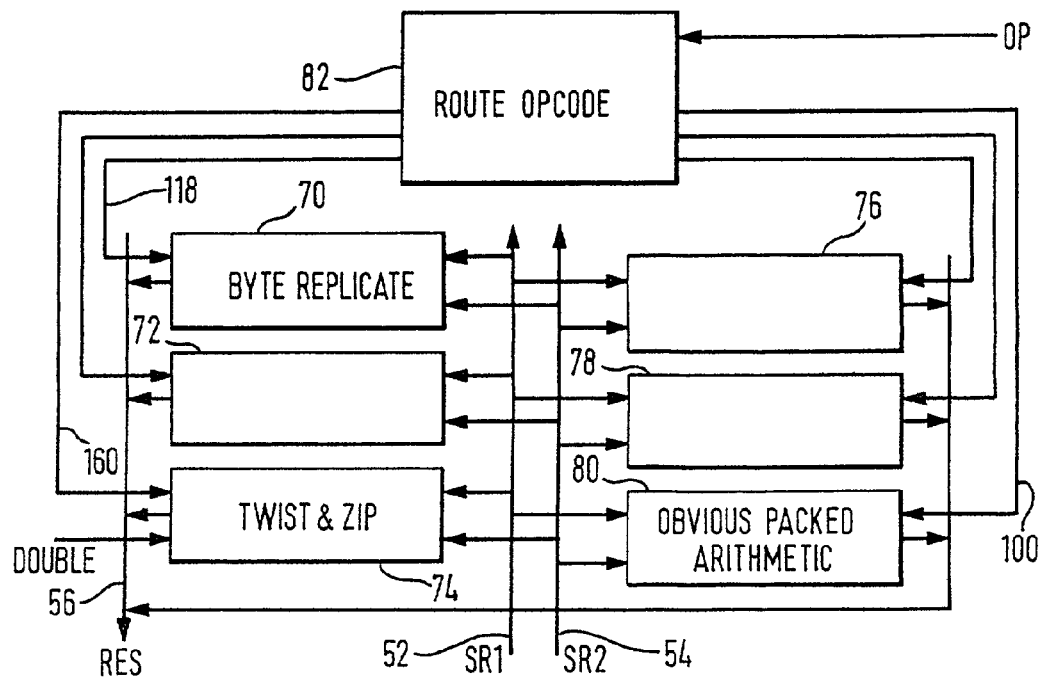
FIG. 6 is a block diagram of a packed arithmetic unit.

FIG. 6 shows in a block diagram the packed arithmetic unit 6. This is shown as a collection of separate units each responsible for some subset of packed arithmetic instructions. Another implementation could combine the functions in different ways. The units include a byte replicate unit 70, a twiddle unit 72, a twist and zip unit 74, a roll unit 76, an obvious packed arithmetic unit 80 and another packed arithmetic unit 78 not described herein. These are operated responsive to a route opcode unit 82 which selectively controls the arithmetic units 70 to 80. Operands for the arithmetic units 70 to 80 are supplied along the Source 1 and Source 2 buses 52,54. Results from the arithmetic units are supplied to the result bus 56. The op input to the route opcode unit 82 receives the Pack Ops instruction from the control unit 16 (FIG. 1). It will be appreciated that the operands supplied on the Source 1 and Source 2 buses are loaded into respective input buffers of the arithmetic units and the results supplied from one or two output buffers to one or two destination registers in the register file 12.

Obvious Packed Arithmetic

The obvious packed arithmetic unit 80 performs operations taking the two source operands as containing several packed objects each and operating on respective pairs of objects in the two operands to produce a result also containing the same number of packed objects as each source. The operations supported can be addition, subtraction, comparison, multiplication, left shift, right shift etc. As explained above, by addressing a register using a single address an operand will be accessed. The operand comprises a plurality of objects which cannot be individually addressed.

Figure 7:
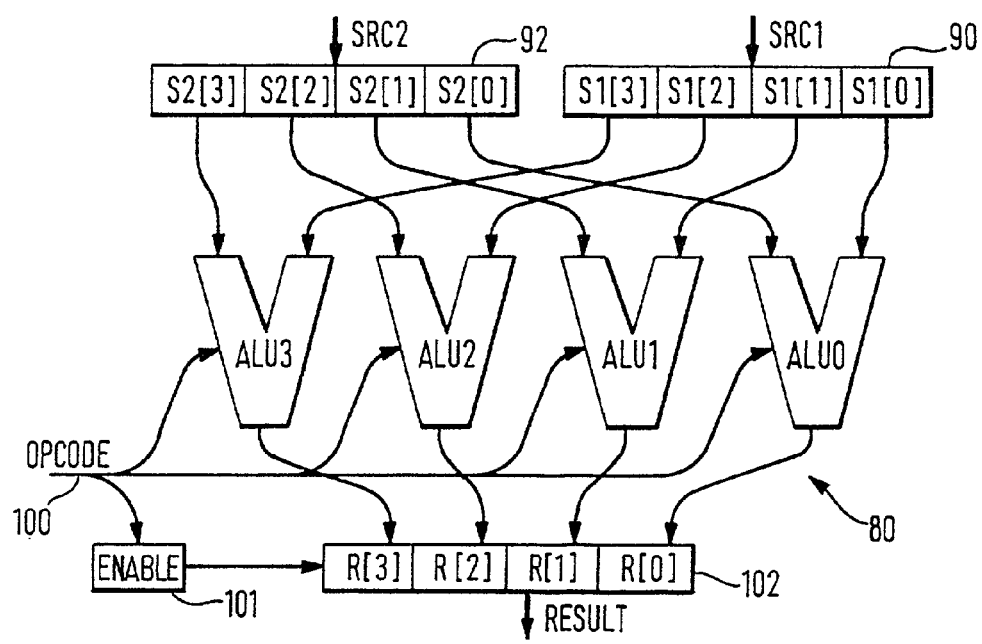
FIG. 7 shows the meaning of symbols used in the figures.

FIG. 7 shows the symbols used in the diagrams illustrating the arithmetic units of the packed arithmetic unit 6.

FIG. 8 shows an obvious packed arithmetic unit which can perform addition, subtraction, comparison and multiplication of packed 16 bit numbers. As, in this case, the source and result bus widths are 64 bit, there are four packed objects, each 16 bits long, on each bus.

Figures 3, 4:
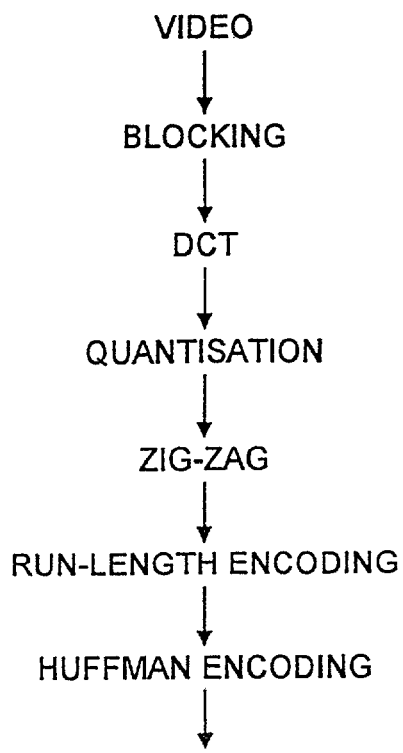
FIG. 3 illustrates an example of a method of I-frame compression.
FIG. 4 illustrates an example of a look-up table for implementing zigzag encoding.

The obvious packed arithmetic unit 80 comprises four arithmetic logical units ALU0-ALU3, each of which are controlled by opcode on line 100 which is derived form the route opcode unit 82 in FIG. 3. The 64 bit word supplied from source register 1 SRC1 contains four packed objects S1[0]-S1[3]. The 64 bit word supplied from source register 2 SRC2 contains four packed objects S2[0]-S2[3]. These are stored in first and second input buffers 90,92. The first arithmetic logic unit ALU0 operates on the first packed object in each operand, S1[0] and S2[0] to generate a result R[0]. The second to fourth arithmetic logic units ALU1-ALU3 similarly take the second to fourth pairs of objects and provide respective results R[1] to R[3]. These are stored in a result buffer 102. The result word thus contains four packed objects. An enable unit 101 determines if any of the unit should be active and controls whether the output buffer asserts its output.

The instructions are named as follows:

| | |
|---|---|
| add2p | Add each respective S1[i] to S2[i] as 2's complement numbers producing R[i]. Overflow is ignored. |
| sub2p | Subtract each respective S2[i] from S1[i] as 2's complement numbers producing R[i]. Overflow is ignored. |
| cmpe2p | Compare each respective S1[i] with S2[i]. If they are equal, set R[i] to all ones; if they are different, set R[i] to zero. |
| cmpge2ps | Compare each respective S1[i] with S2[i] as signed 2's complement numbers. If S1[i] is greater than or equal to S2[i] set R[i] to all ones; if S1[i] is less than S2[i] set R[i] to zero. |

-continued

| | |
|---|---|
| mul2ps | Multiply each respective S1[i] by S2[i] as signed 2's complement numbers setting R[i] to the least significant 16 bits of the full (32 bit) product. |

Figure 9:
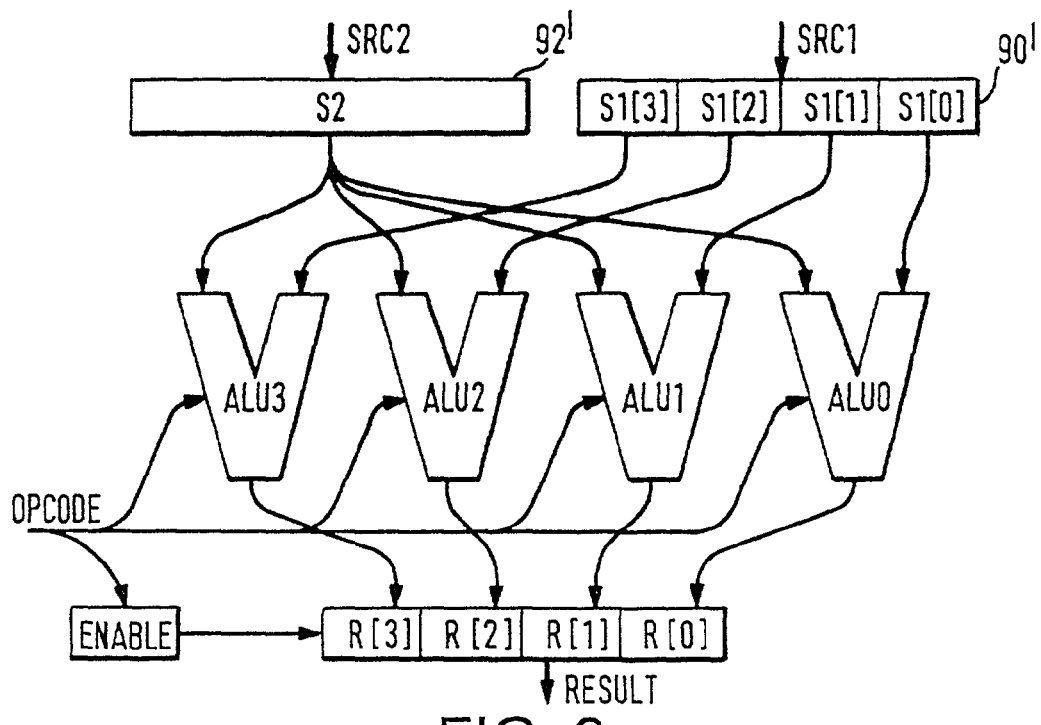
FIG. 9 is a block diagram of an obvious packed arithmetic unit which operates on a packed source operand and an unpacked source operand.

Some obvious packed arithmetic instructions naturally take one packed source operand and one unpacked source operand. FIG. 9 shows such a unit.

The contents of the packed arithmetic unit of FIG. 5 are substantially the same as that of FIG. 4. The only difference is that the input buffer 92' for the second source operand receives the source operand in unpacked form. The input buffer 92' receives the first source operand in packed form as before. One example of instructions using an unpacked source operand and a packed source operand are shift instructions, where the amount to shift by is not packed, so that the same shift can be applied to all the packed objects. Whilst it is not necessary for the shift amount to be unpacked, this is more useful.

| | |
|---|---|
| shl2p | Shift each respective S1[i] left by S2 (which is not packed), setting R[i] to the result. |
| shr2ps | Shift each respective S1[i] right by S2 (which is not packed, setting R[i] to the result. The shift is signed, because the sign bit is duplicated when shifting. |

It is assumed that the same set of operations are provided for packed 8 bit and packed 32 bit objects. The instructions have similar names, but replacing the "2" with a "1" or a "4".

Byte Replicate

Figure 10:
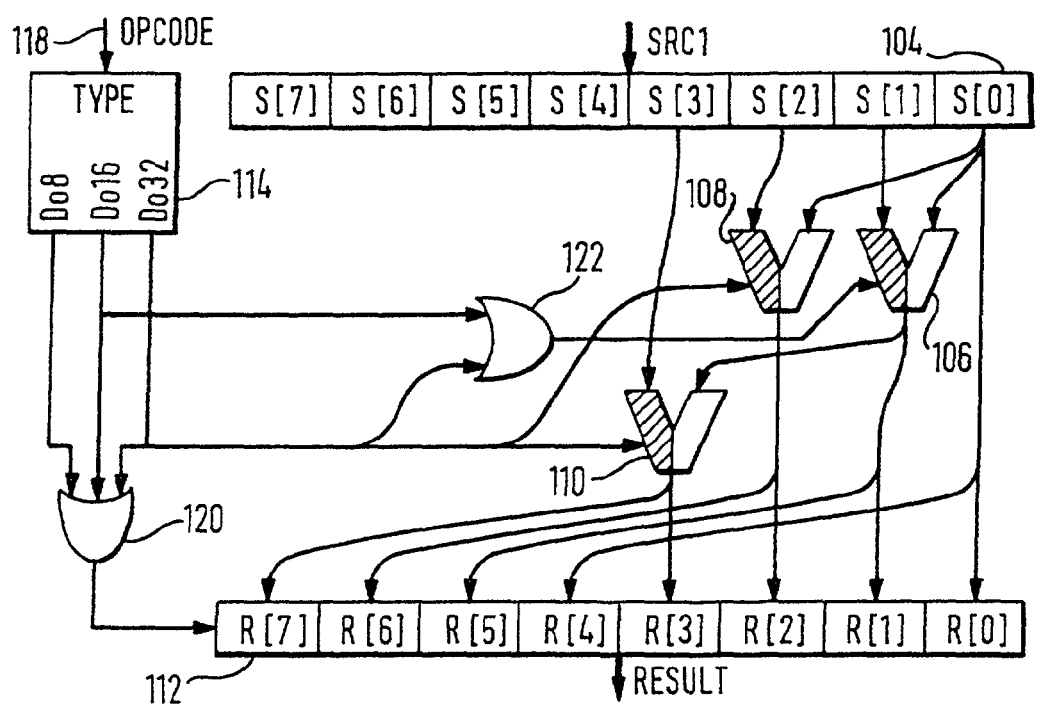
FIG. 10 shows a byte replicate unit.

FIG. 10 shows the byte replicate unit 70. The byte replicate unit comprises an input buffer 104 which receives a single operand which in FIG. 10 is illustrated as a 64 bit word comprising eight packed 8 bit objects S[0] to S[7]. A first multiplexer 106 receives as inputs the first object S[0] and the second object S[1]. A second multiplexer 108 receives as inputs the first object S[0] and the third object S[2]. A third multiplexer 110 receives as inputs the output of the first multiplexer 108 and the fourth object S[3]. The byte replicate unit also comprises an output buffer 112. The output buffer holds a 64 bit word packed as eight 8 bit objects R[0] and R[7]. The first and fifth 8 bit locations of the output buffer 112 are connected directly to the first 8 bits of the input buffer 104. The second and sixth 8 bit locations of the output buffer 112 are connected to receive the output of the first multiplexer 106. The third and seventh 8 bit locations of the output buffer 112 are connected to receive the output of the second multiplexer 108. The fourth and eighth 8 bit locations of the output buffer 112 are connected to receive the output of the third multiplexer 110. The 8 bit result objects in the output buffer are referred to as R[0] to R[7]. A type unit 114 receives opcode on line 118 derived from the route opcode unit 82 in FIG. 7. The type unit selects the size of the object to be replicated and provides one of three output signals D08, D016, D032. These output signals are supplied to an OR gate 120. The output of the OR gate enables the output buffer 112. The D016 and D032 signals are input to a second OR gate 122 the output of which controls the first multiplexer 106. The D032 signal itself controls the second and third multiplexers 108,110. The byte replicate unit thus takes the least significant object (8, 16 or 32 bits) of the source operand and replicates it 8, 4 or 2 times, to produce the packed 64 bit result held in output buffer 112. The operation is broken down into 8 bit pieces, each of S[i] and R[i] are 8 bits. Some logic is shared for the different replications. The type unit 114 determines whether to replicate 16 bit or 32 bit sequences. If neither signal D016 or D032 is asserted, 8 bit sequences will be replicated.

The three instructions supported by the byte replicate unite are:

| | |
|---|---|
| rep1p | Replicate S[0] into each of R[0] to R[7]. |
| rep2p | Replicate S[0] and S[1] into R[2i] and R[2i + 1] for l from 0 to 3, thus replicating 16 bits. |
| rep4p | Replicate S[0] to S[3] into R[4i] to R[4i + 3] for i from 0 to 1, thus replicating 32 bits. |

Twist and Zip

There are three kinds of restructuring operations executed by the twist and zip unit 74.

These are:

| | |
|---|---|
| Shuffle (zip) | This takes a source string consisting of pairs of object strings and interleaves the objects from the object string pairs to produce a single resultant string of the same length as the source string. This is a perfect shuffle. |
| Sort (unzip) | This takes a source string containing object pairs and deinterleaves the pairs to produce a result string consisting of the concatenation of the deinterleaved pairs. This is a perfect sort. |
| Transpose (flip) | This takes a source string containing object quadruples and produces a result string by exchanging appropriate source objects to affect a set of matrix transposes. |

Any one of these operations can alternatively be constructed from suitable combinations of the other two operations.

For all these transformations the source string consists of a number of vectors, each containing the same number of equally sized objects. To name these transformations requires three numbers.

| | |
|---|---|
| number of vectors | This specifies the number of vectors in the source and result strings. |
| size of vector | This specifies the number of objects in each vector. |
| size of object | This specifies the number of bits in each object. |

The instruction names consist of a transform type (zip, unzip, flip), followed by the number of vectors suffixed by an "n", The size of each vector suffixed by a "v" and the object size expressed as a number of 8 bit bytes suffixed by a "p". Thus, in the instruction zip4n2vlp, zip denotes the instruction type, and the 4n2vlp specifies the operand format. In this case a zip operation is to be executed on 4 vectors each of two one byte objects. To do this particular operation, as each zip requires two vectors, two separate zips are done.

Figure 11:
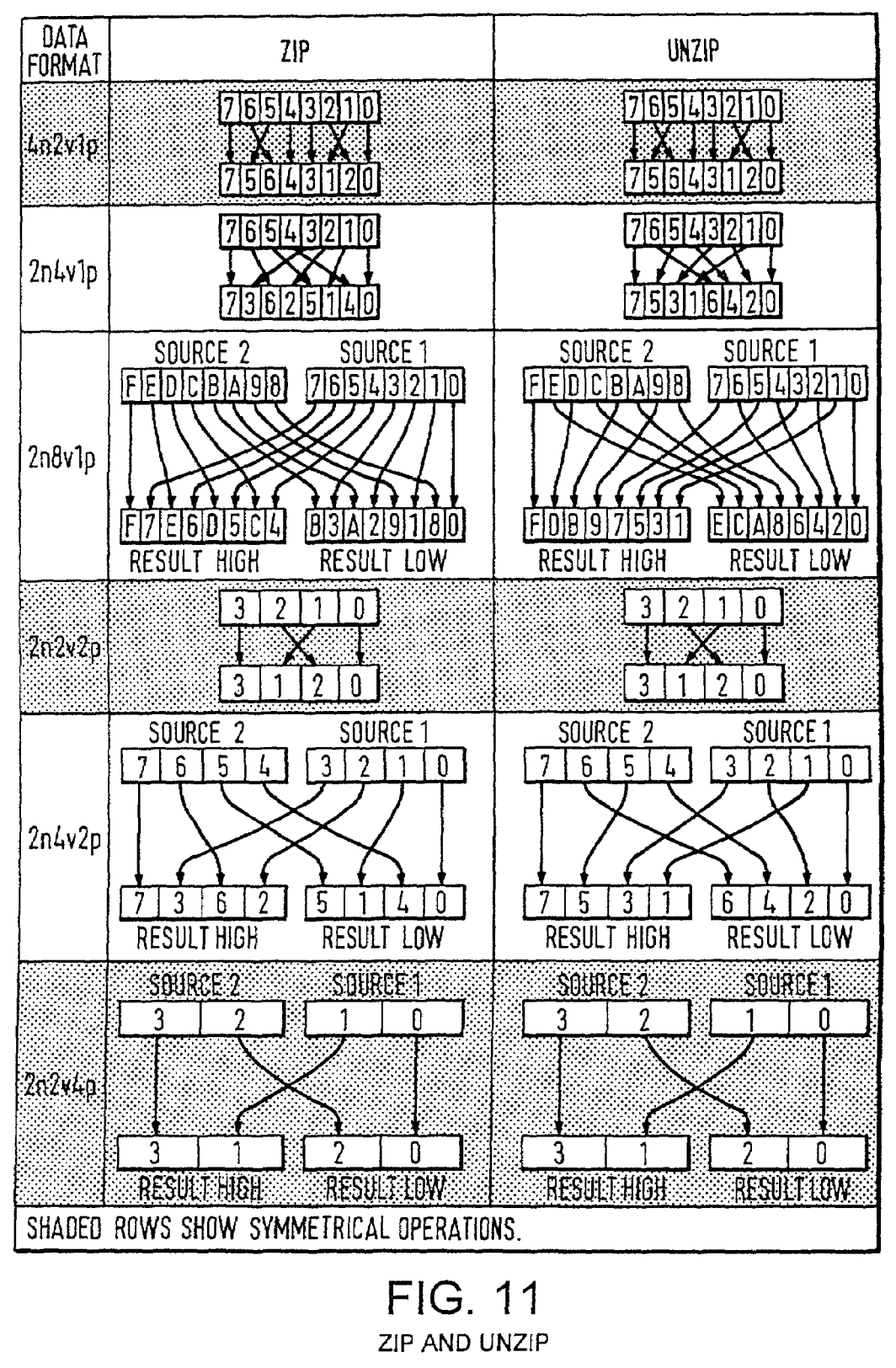

When the source and result strings are 64 or 128 bits in total there are 9 unique zip and unzip transforms which are shown in FIG. 11.

This set of zips and unzips is complete for the 64 and 128 bit strings supported by this implementation. Zips and unzips of longer strings can be performed by sequences of these instructions, in conjunction with conventional move instructions.

Figure 12:
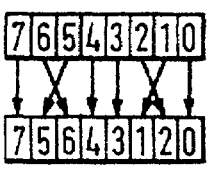
FIG. 12 shows flip restructuring operations.

The flips appropriate to 64 and 128 bit strings are shown in FIG. 12. Some of these are the same as some of the zip and unzips in FIG. 11.

As with the zips and unzips, this set of flips is complete for 64 and 128 bit strings. Flips of longer strings can be performed by sequences of flips and conventional move instructions.

Figure 2:
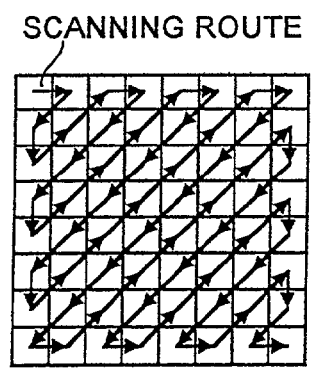
FIG. 2 illustrates an example of a zigzag scan.
Figure 13:
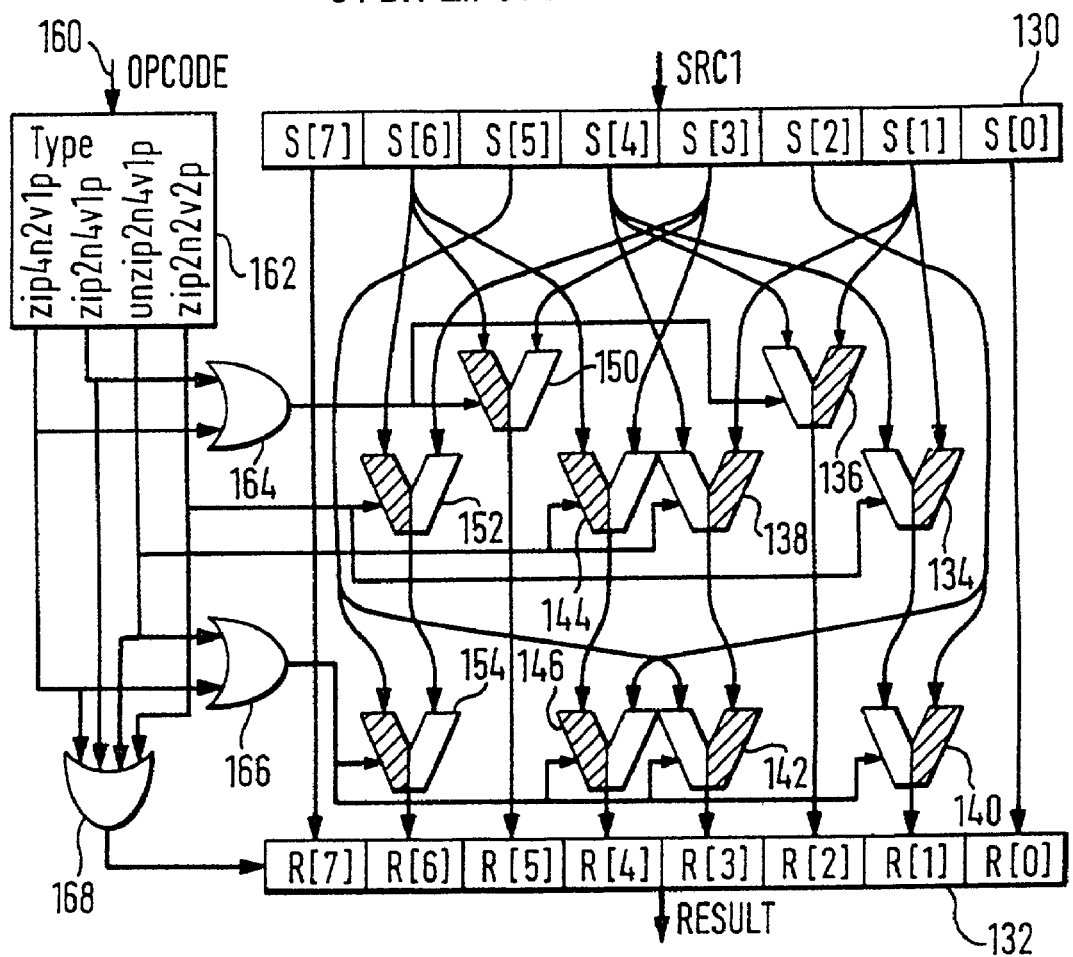
FIG. 13 shows part of the twist and zip unit for performing 64 bit zips and unzips.

FIG. 13 shows the part of the twist and zip unit 74 which deals with 64 bit zips and unzips. The zip and unzip part of the twist and zip unit shown in FIG. 13 comprises an input buffer 130 containing eight packed 8 bit source objects S[0] to S[7]. A result buffer 132 is provided to hold eight packed 8 bit result objects R[0] to R[7]. The result R[0] is connected directly to the first source object S[0]. The second source object S[1] is supplied as one input to a first multiplexer 134, a second multiplexer 136, and a third multiplexer 138. The first, second an third multiplexers 134,136,138 receive as their second input the fifth source object S[4]. A fourth multiplexer 140 receives as one input the third source object S[2] and as its other input the output of the first multiplexer 134. The output of the fourth multiplexer provides the second result object R[1]. The output of the second multiplexer 136 provides the third result object R[2]. A fifth multiplexer 142 receives as inputs the output of the third multiplexer 138 and the sixth source object S[5]. The output of the fifth multiplexer 142 supplies the fourth result object R[3]. A sixth multiplexer 144 receives as one input the fourth source object S[3] and as the other input the seventh source object S[6]. The output of the sixth multiplexer is supplies as one input to a seventh multiplexer 146, the other input of which is the third source object S[2]. The output of the seventh multiplexer 146 supplies the fourth result object R[4]. An eighth multiplexer 150 receives as one input the fourth source object S[6] and supplies as its output the sixth result object R[5]. A ninth multiplexer 153 receives as one input the fourth source object S[3] and as another input the seventh source object S[6]. The output of the ninth multiplexer 152 is supplied to a tenth multiplexer 154 which receives as a second input the sixth source object S[5]/ The output of the tenth multiplexer 154 provides the seventh result object R[6]. The eighth source object S[7] is connected directly to provide the eighth result object R7. A type unit 162 receives opcode on line 160 derived from the route opcode unit 82 in FIG. 2. The type unit 162 defines the instruction to be executed by the zip and unzip part of the twist and zip unit 74. For this purpose it supplies one of four output signals zip2n2v2p, unzip2n4v1p, zip2n4v1p and zip4n2v1p. The zip2n4v1p and zip4n2v1p outputs are supplied to a first OR gate 164 the output of which controls the eighth multiplexer 150. The output signal zip4n2v1p is also supplied to a second OR gate 166 which receives the output unzip2n4v1p. The output of the second OR gate controls the fourth, fifth, seventh and tenth multiplexers. The signal unzip2n4v1p controls the third and sixth multiplexers. The output zip2n2v2p controls the first and ninth multiplexers. All four outputs of the type unit 162 are supplied to a third OR gate 168 which determines whether or not the output buffer 132 is enabled. Some of the logic paths are shared in FIG. 9, this requiring only ten 8 bit multiplexers. The source and result are shown as packed 8 bit objects. However, one of the instructions this implements is defined in terms of packed 16 bit objects and this is achieved by taking pairs of source and result 8 bit objects.

The 64 bit zips and unzips are:

| | |
|---|---|
| zip4n2v1p | Zips (interleaves) vectors of two 8 bit objects. This is the same as unzipping (deinterleaving) the same vectors. |
| zip2n4v1p | Zips (interleaves) vectors of four 8 bit objects. |
| unzip2n4v1p | Unzips (deinterleaves) vectors of four 8 bit objects. |
| zip2n2v2p | Zips (interleaves) vectors of two 16 bit objects. This is the same as unzipping (deinterleaving) the same objects. |

Figure 14:
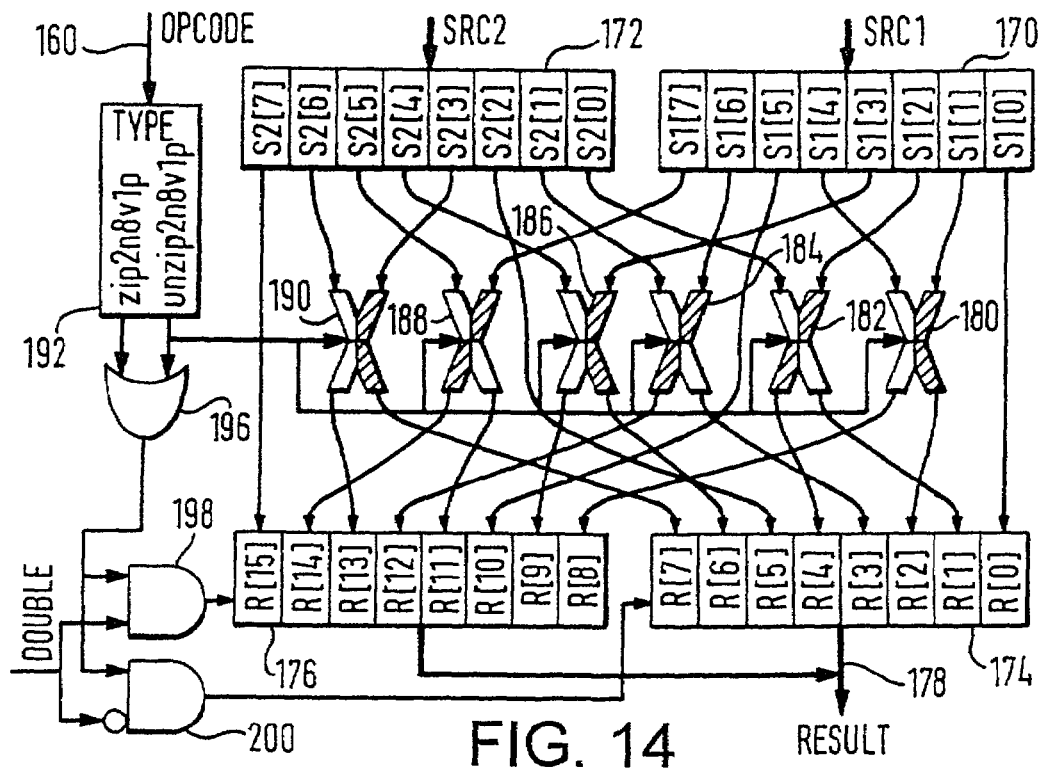
FIG. 14 shows part of the twist and zip unit for performing double length 8 bit zips and unzips.

FIG. 14 shows the part of the twist and zip unit which performs the double length 8 bit zip and unzip instructions. This part of the twist and zip unit comprises first and second input buffers 170,172 each of which hold a 64 bit word. The 64 bit words held in the input buffer 170,172 can be viewed as a continuous data string which has sixteen objects labelled from S1[0] to S2[7]. There are first and second output buffers 174,176 which each hold a 64 bit word. The result is output on line 178. There are six changeover switches 180 to 190 each of which have two inputs and two outputs. The inputs of the changeover switches 180 to 190 are connected to locations in the first and second input buffers 170,172 as illustrated in FIG. 14. The outputs of the changeover switches 180 to 190 are connected to locations in the first and second output buffers 174,176 as illustrated in FIG. 14. The connections are such that either the zip2n8v1p operation or the unzip2n8v1p operation as illustrated in FIG. 11 can be implemented. It can be seen from FIG. 14 that the first location in the first input buffer S1[0] and the last location in the second input buffer S2[7] are connected respectively to the first location R1[0] in the output buffer and the last location R2[7] in the second output buffer. In this way, the locations in the data string of the first and last objects remains unchanged after restructuring of the data string according to the zip and unzip instruction. A type unit 192 receives opcode on line 160 derived from the route opcode unit 82 to FIG. 7. The type unit 192 outputs one of two signals dependent on whether the restructuring instruction is a zip or unzip instruction, zip2n8v1p or unzip2n8v1p. These output signals are supplied to an OR gate 196. The unzip2n8v1p signal controls the changeover switches 180 to 190. The output of the OR gate 196 is supplied to two AND gates 198,200. The AND gate 198 also receives the Double signal 58. The AND gate 200 receives the Double signal 58, inverted. The AND gate 200 controls the first output buffer 174 and the AND gate 198 controls the second output buffer 176. The two output buffers are controlled by the Double signal which causes the first output buffer 174 to supply its contents along line 178 to a first destination register and then changes state so that the second output buffer 176 supplies its contents along line 178 to a subsequent register in the register file 12.

The two instructions processed are:

| | |
|---|---|
| zip2n8v1p | Zip (interleave) vectors of eight 8 bit objects. |
| unzip2n8v1p | Unzip (deinterleave) vectors of eight 8 bit objects. |

Figure 15:
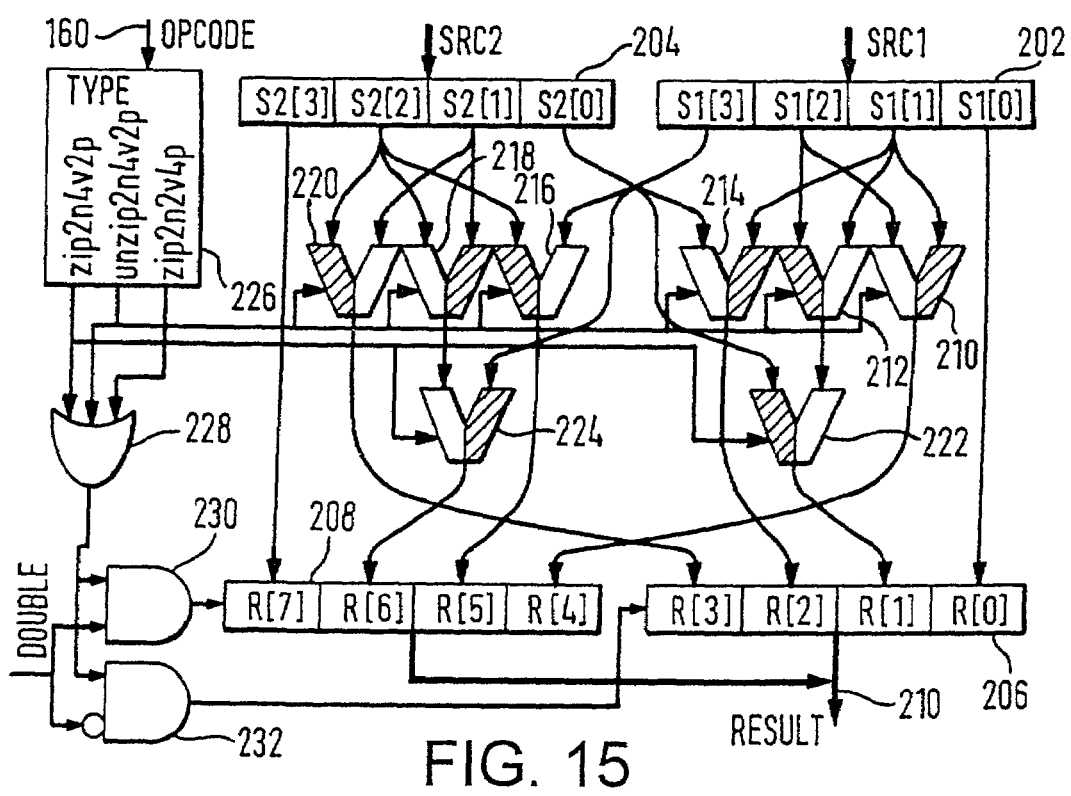
FIG. 15 shows part of the twist and zip unit for performing double length 16 bit and 32 bit zips and unzips.

FIG. 15 shows the part of the twist and zip unit which performs the double length 16 bit and 32 bit zip and unzip instructions. This part has first and second input buffers 202, 204 each of which holds a 64 bit word defining four 16 bit objects in packed form. Two objects can be dealt with together by use of the 32 bit zip instruction. First and second output buffers 206 and 208 each hold a 64 bit word defining four packed 16 bit objects R[0] to R[3], R[4] to R[7]. The result is supplied on line 210. The Double signal 58 controls the sequence in which the output buffers assert there its output. As with the other parts of the twist and zip unit, locations in the first input buffer for the first object are connected directly to the first object location in the first output buffer likewise, the last source object location in the second input buffer 204 is connected directly to the last result objection location R[7] in the second output buffer 208.

A first multiplexer 212 receives as one input the source object S1[1] and as a second input the source object S1[2]. A second multiplexer 212 receives as one input the second source object S1[1] and as a second input the third source object S1[2]. A third multiplexer 214 receives as one input the second source object S1[1] and as a second input the first source object S2[0] of the second input buffer. A fourth multiplexer 216 receives as one input the source object S1[3] and as a second input the source object S2[2]. A fifth multiplexer 218 receives as one input the source object S2[1] and as a second input the source object S2[2]. A sixth multiplexer 220 receives as one input the source object S2[1] and as a second input the source object S2[2]. The output of the first multiplexer 210 supplies the first result object R[4] of the second output buffer 208. The output of the second multiplexer 212 is supplied to a seventh multiplexer 222 which receives as its second input the source object S2[0]. The output of the second multiplexer 222 supplies the second result object R[1] in the first output buffer 206. The output of the third multiplexer 214 supplies the third result object R[2] in the first output buffer 206. The output of the fourth multiplexer 216 supplies the second result object R[5] in the second output buffer 208. The output of the fifth multiplexer 218 is supplied as one input to an eighth multiplexer 224 which receives as its second input the source object S1[3]. The output of the eighth multiplexer 224 supplies the third result object R[6] in the second output buffer 208. The output of the sixth multiplexer 220 supplies the fourth result object R[3] in the first output buffer 206. A type unit 226 receives opcode on line 160 from the route opcode unit 82 of FIG. 3. The type unit generates three output signals depending on the type of restructuring operation to be carried out by this part of the twist and zip unit. These signals are zip2n4v2p, unzip2m4v2p and zip2n2v4p. These signals are supplied to an OR gate 228 the output of which is supplied to two AND gates 230 and 232. The AND gate 230 also receives the Double signal. The AND gate 232 receives an inverted version of the Double signal. The outputs of the AND gates 230,232 control activation of the output buffers 206, 208.

The zip2n4v2p signal controls the third and seventh multiplexers 214,222. The unzip2n4v2p signal controls the first, second, fourth and fifth multiplexers.

The three instructions processed by this part of the twist and zip unit are:

| | |
|---|---|
| zip2n4v2p | Zip (interleave) vectors of four 16 bit objects. |
| unzip2n4v2p | Unzip (deinterleave) vectors of four 16 bit objects. |
| zip2n2v4p | Zip (interleave) vectors of two 32 bit objects. This is the same as unzipping (deinterleaving) the same vectors. |

Figure 16:
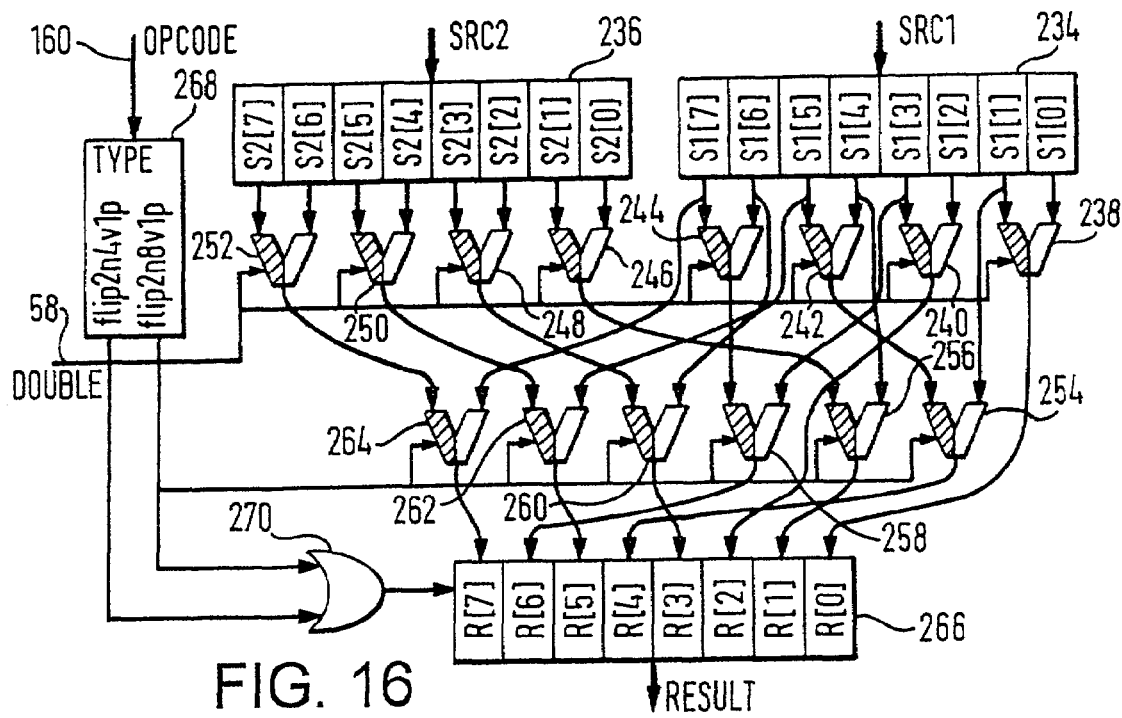
FIG. 16 shows part of the twist and zip unit for performing 8 bit flips.

FIG. 16 shows the part of the twist and zip unit which can perform the 8 bit flips. This does both the single length and double length operations. In FIG. 12 there are two input buffers 234,236 each containing a 64 bit word packed as 8 bit objects. Adjacent pairs of objects in the first and second input buffers 234,236 are supplies to respective multiplexers 238-252. A second set of multiplexers 254-264 is arranged as follows. The first multiplexer 254 of the second set receives as one input the second source object in the first output buffer 234 and as a second input the output of the third multiplexer 242 of the first set. The second multiplexer 256 of the second set receives a one input the fifth source object of the first output buffer 234 and as a second input the output of the fifth multiplexer 246 of the first set. The third multiplexer 258 of the second set receives as one input the fourth source object of the first output buffer 234 and as a second input the output of the fourth multiplexer 244 of the first set. The fourth multiplexer 260 of the second set receives as one input the seventh source object of the first output buffer 234 and as a second input the output of the sixth multiplexer of the first set. The fifth multiplexer 262 of the first set receives as one input the sixth source object of the first output buffer and as a second input the output of the seventh multiplexer 250 of the first set. The sixth multiplexer 264 of the second set receives as one input the eighth source object of the first output buffer 234 and as a second input the output of the eighth multiplexer 252 of the first set. The 8 bit flip part of the twist and zip unit also includes an output buffer 266 for accommodating a 64 bit word as 8 bit packed objects. The first result object is supplied as the output of the first multiplexer 238 of the first set. The second source object is supplied as the output of the second multiplexer 256 of the second set. The third object of the result is supplies as the output of the second multiplexer 240 of the first set. The fourth object of the result is supplies as the output of the fourth multiplexer 260 of the second set. The fifth object of the result is supplied as the output of the first multiplexer 254 of the first set. The sixth object of the result is supplied as the output of the fifth multiplexer 262 of the second set. The seventh object of the result is supplied as the output of the third multiplexer 258 of the second set. The eighth object of the result is supplies as the output of the sixth multiplexer of the second set 164. A type unit 268 receives opcode on line 160 and produces two signals depending on the type of restructuring operation to be carried out. These signals are flip2n4v1p and flip2n8v1p. These signals are supplied to an OR gate 270 and the output of which controls the output buffer 266. The Double signal 58 controls the multiplexers 238 to 252 of the first set. The Double signal will only be active for the upper part of the double length instructions. The multiplexers in the second set 254 to 264 are controlled by the flip2n8v1p signal.

In FIG. 16, only a single 64 bit output buffer is illustrated. When the flip2n4v1p instruction is being executed, the buffer corresponds to the single output buffer shown in FIG. 13. When the 2n8v1p flip instruction is being executed, the output buffer first holds and supplies the RESULT LOW part of the result and then when the Double signal 58 is asserted, holds and supplies the RESULT HIGH part of the result.

The two instructions processed by the unit are:

| | |
|---|---|
| flip2n4v1p | Flip vectors of four 8 bit objects. |
| flip2n8v1p | Flip vectors of eight 8 bit objects. |

Figure 17:
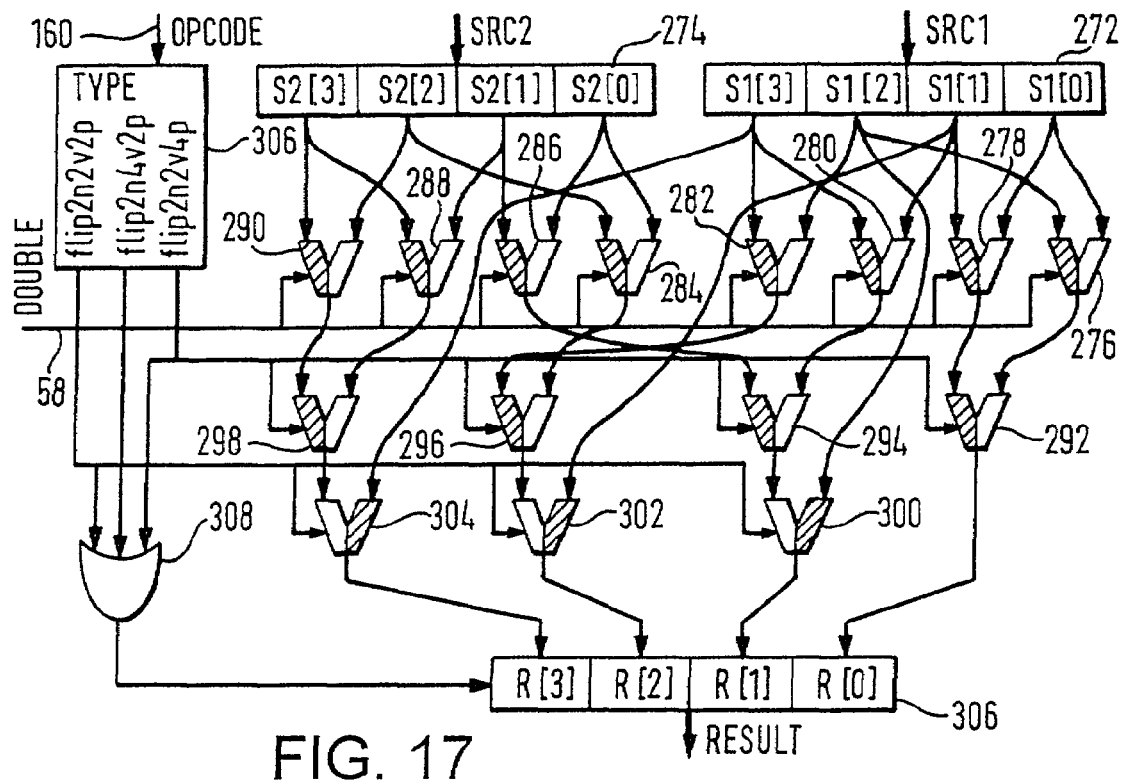
FIG. 17 shows part of the twist and zip unit for performing 16 bit and 32 bit flips.

FIG. 17 shows the part of the twist and zip unit which performs the 16 bit and 32 bit flips. As with the 8 bit flip unit, it performs both single and double length flips. The 32 bit objects are dealt with as pairs of 16 bit objects.

The three instructions processed by the unit are:

| | |
|---|---|
| flip2n2v2p | Flip vectors of two 16 bit objects. |
| flip2n4v2p | Flip vectors of four 16 bit objects. |
| flip2n2v4p | Flip vectors of two 32 bit objects. |

Two of these three flips are the same as two of the zips. Therefore, if both sets of instructions are present, only one set of hardware needs implementing.

This part of the twist and zip unit comprises first and second input buffers 272,274 each of which accommodates a 64 bit word packed as four 16 bit objects S1[0] to S1[3] in the first input buffer and S2[0] to S2[3] in the second input buffer 274. A first set of multiplexers 276 to 290 receive inputs from the first and second input buffers 272,274 as follows. The first multiplexer 276 of the first set receives as one input the first source object S1[0] and as a second input the third source object S1[2]. The second multiplexer 278 of the first set receives as one input the first source object S1[0] and as a second input the second source object S1[1]. The third multiplexer 280 of the first set receives as one input the second source object S1[1] and as a second input the fourth source object S1[3]. The fourth multiplexer of the first set 282 receives as one input the third source object S1[2] and as a second input the fourth source object S1[3]. The fourth multiplexer 284 of the first set receives as one input the first source object S2[0] of the second buffer 274 and as a second input the third source object S2[2]. The sixth multiplexer 286 of the first set receives as one input the first source object S2[0] of the second buffer 274 and as a second input the second source object S2[1]. The seventh multiplexer 288 receives as one input the second source object S2[1] and as a second input the fourth source object S2[3]. The eighth multiplexer 290 receives as one input the third source object S2[2] of the second input buffer 274 and as a second input the fourth source object S2[3]. A second set of multiplexers 292 to 298 receive inputs as follows. The first multiplexer 292 of the second set receives as inputs the outputs of the first and second multiplexers 276,278 of the first set. The second multiplexer 294 of the second set receives as inputs the outputs from the third and sixth multiplexers 280,286 of the first set. The third multiplexer 296 of the second set receives as inputs the output of the fifth multiplexer 284 of the first set and the fourth multiplexer 282 of the first set. The fourth multiplexer of the third set receives as inputs the outputs of the seventh and eighth multiplexers 288,290 of the first set. A third set of multiplexers 300-304 receive inputs as follows. The first multiplexer 300 of the third set receives as inputs the third source object S1[2] of the first input buffer 272 and the output of the second multiplexer 294 of the third set. The second multiplexer 302 of the third set receives as inputs the second source object S1[1] of the first input buffer 272 and the output of the third multiplexer 296 of the second set. The third multiplexer 304 of the third set receives as inputs the fourth object S1[3] of the first input buffer 272 and the output of the fourth multiplexer 298 of the second set.

This part of the twist and zip unit also contains an output buffer 306 capable of accommodating a 64 bit word packed as four 16 bit objects. The first result object R[0] is derived from the first multiplexer 292 of the second set. The second to fourth result objects R[1] to R[3] are derived form the outputs of the multiplexers of the third set 300-304.

A type unit 306 receives opcode on line 160 from the route opcode unit 82 in FIG. 7. The type unit generates three signals depending on the type of restructuring instruction to be executed by this part of the unit. The signals are flip2n2v2p, flip2n4v2p and flip2n2v4p. These signals are supplied to an OR gate 308 the output of which controls the output buffer 306. The Double signal 58 controls the multiplexers of the first set 276 to 290. The flip2n2v4p signal controls the multiplexers of the second set. The flip2n2v2p signal controls the multiplexers of the third set.

When this part of the unit is used to execute the flip2n2v2p unit, the output buffer is the single output buffer shown in FIG. 11 for that instruction. When this part of the unit is used to execute the flip2n4v2p or flip2n2v4p instructions, the output buffer behaves as described above with reference to FIG. 12.

Twiddle

The twiddle unit 72 executes a twiddle instruction. This takes an object string and reverses the order of the objects from the object string to produce a single resultant string of the same length as the object string. This operation is illustrated, for the case of an object string (for instance of 64 bits) containing four objects (for instance each of 16 bits), in FIG. 18.

Roll

The roll unit 76 executes a roll instruction. This takes an object string and shifts each object in it to the right by a specified amount, replacing that amount of the right-most objects in the object string on the left to produce a single resultant string of the same length as the object string. Assuming a 64 bit object string containing four 16 bit objects each of two bytes FIG. 19 shows three available roll instructions. A number specifying the number of bytes to be shifted to the right is given as a suffix to the instruction.

One advantageous application of the computer is in the field of video compression, for instance in performing zigzag operations prior to Huffman encoding. By using the restructuring operations described above in the zigzag process described below an increase in speed of 15% or more has been achieved over the conventional look-up table technique. This is at least in part because the look-up table technique involves more memory accesses : a memory load to obtain a data element to be moved, a memory load to obtain the output index from the look-up table and a memory store to store the data element.

The following code implements a forward zigzag operation on an 8×8 matrix of 16 bit input data objects. The input data objects are loaded into 16 64 bit registers (r0 to r15) each containing four of the data objects, as shown in the left-hand table of FIG. 20. The 64 bit object strings held in each register are then manipulated using the register manipulation instructions described above to reorder the data objects in accordance with the zigzag operation illustrated in FIG. 2. This produces the ordering shown in the right-hand table of FIG. 20. Incidentally, this example illustrates the case of a little-endian system; for a big-endian system a different sequence of manipulations would be needed.

```
/* Zigzag macro for encoder */
#define swap_ends(reg) zip2v2p(twiddle(reg, 0xc));
TI8us t1, t2, t3, t4; /* defines t1-t4 as 64 bit registers */
t1=zip4v2pl(r2, r4);
t2=zip2v4pl(r0, t1);
t1=roll6(r2, r2);
t1=zip2v4ph(r0, t1);
t1=roll6(t1, t1);
t1=swap_ends(t1);
r0=t2;
r2=twiddle(r2, 4);
r2=zip4v2ph(r4, r2);
t2=zip2v4pl(r2, r1);
t3=twiddle(r4, 4);
t3=zip4v2pl(t3, r8);
r2=zip4v2pl(t3, r6);
r4=zip4v2ph(r4, t3);
t3=twiddle(r6, 8);
t3=zip4v2pl(r3, r3);
r4=twiddle(r4, 8);
r4=zip4v2pl(t3, r4);
t4=twiddle(r5, 8);
t4=zip4v2ph(t4, r1);
t3=twiddle(t3, 0xc);
r6=zip4v2pl(t3, t4);
t3=twiddle(r1, 4);
t4=twiddle(r5, 4);
t3=zip4v2ph(t3, r3);
t4=zip4v2pl(t4, r7);
t3=zip2v4pl(t3, t4);
r1=t1;
t4=zip4v2ph(t4, r3);
t4=zip4v2ph(t4, r5);
r3=t2;
r5=twiddle(r12, 8);
r5=zip4v2ph(r5, r8);
r5=zip4v2pl(r10, r5);
t1=twiddle(r11, 4);
t1=zip4v2ph(r7, t1);
t1=zip4v2ph(r9, t1);
r7=twiddle(r7, 0xc);
r7=zip4v2pl(r7, r9);
t2=twiddle(r11, 0xc);
t2=zip4v2ph(t2, t12);
t2=zip2v4ph(r7, t2);
r7=t3;
t3=twiddle(r12, 0xc);
t3=zip4v2pl(r14, t3);
r9=twiddle(r9, 0xc);
r9=zip4v2ph(r10, r9);
r9=zip2v4ph(t3, r9);
r8=twiddle(r8, 4);
r8=zip4v2ph(r8, r10);
r12=twiddle(r12, 4);
r12=zip4v2pl(r12, r14);
r8=zip2v4pl(r8, r12);
r10=t4;
t3=twiddle(r11, 4);
t3=zip4v2pl(t3, r13);
t3=twiddle(t3, 0xc);
r12=zip2v4ph(r14, t3);
r11=zip4v2ph(r11, r13);
t3=zip2v4ph(r11, r15);
r11=t2;
r15=zip2v4pl(r15, r15);
r14=zip4v2ph(r13, r15);
r15=zip4v2pl(r13, r15);
r14=twiddle(r14, 0xc);
r14=zip4v2ph(r15, r14);
r13=t1;
r15=t3;
```

Note that the first line of the code defines the operation "swap-ends" to use zip and twiddle instructions to swap the end 16 bit data objects of a specified 64 bit data string.

The suffix h or l at the end of the zip instructions specifies whether the high or low output register should be taken (see FIGS. 11 and 12). It will also be appreciated that the twiddle instructions and the roll instruction could be implemented as a series of zip instructions, albeit with a loss of efficiency.

To illustrate the operation of the code FIG. 21 shows the formation of output register R0 (shown at 400 in FIGS. 20 and 21) from the contacts of input registers R0 (401) and R1 (402) using a shift and a zip instruction. In the full code set out above the remaining registers are generally ordered in a similar way: by a first step of locating in the input registers pairs of data objects that are ordered correctly for their places in their output register, or assembling such pairs; and a second step of combining two of those pairs together to form the four-object contents of an output register. Other strategies could also be used, for instance other combinations of object string reordering instructions, a series of AND, OR and masking instructions or a combination of both.

In an analogous way the following code implements an inverse zigzag operation on an 8×8 matrix of 16 bit input data objects.

```
/* Inverse zigzag macro for decoder */
Tl8us t1, t2, t3, t4; /* defines t1-t4 as 64 bit registers */
r1=roll2(r1, r1);
t1=zip2v4pl(r0, r1);
r3=twiddle(r3, 8);
t2=zip4v2ph(r0, r1);
t3=zip4v2ph(r3, r1);
t3=twiddle(t3, 0xc);
t2=zip4v2pl(t2, t3);;
r0=twiddle(r0, 0xc);
r0=zip4v2pl(r0, r2);
t3=twiddle(r4, 0xc);
t3=zip4v2pl(r3, t3);
t3=zip2v4pl(r0, t3);
r0=t1;
t1=twiddle(r7, 0xc);
t1=zip4v2ph(r6, t1);
r3=twiddle(r3, 8);
r1=zip2v4ph(r3, t1);
t1=twiddle(r6, 8);
r3=zip4v2ph(r4, t1);
t1=zip2v2p(r2);
t1=twiddle(t1, 8);
r3=zip2v4pl(t1, r3);
r2=t2;
t1=zip4v2ph(t1, r4);
t2=twiddle(r8, 0xc);
t2=zip4v2ph(r5, t2);
t2=zip2v4ph(t1, t2);
r5=zip2v2p(r5);
t1=twiddle(r8, 0xc);
t1=zip4v2ph(t1, r9);
t1=zip2v4pl(r5, t1);
r4=twiddle(r4, 4);
r4=zip4v2pl(r4, r7);
t4=zip4v2ph(r6, r10);
t4=twiddle(t4, 8);
t4=zip4v2ph(r4, t4);
r4=t3;
r6=twiddle(r6, 0xc);
r6=unzip4v2pl(r6, r7);
t3=unzip4v2ph(r6, r10);
r6=r3;
r3=t4;
r7=twiddle(r7, 0xc);
r7=zip4v2pl(r7, r10);
r10=t1;
t4=twiddle(r11, 8);
t4=zip4v2pl(t4, r9);
t4=twiddle(t4, 0xc);
t1=zip4v2ph(r5, t8);
t1=zip2v4pl(t1, t4);
r5=t3;
r8=twiddle(r8, 0xc);
r8=zip4v2pl(r8, r9);
t3=zip2v4pl(r8, r12);
r9=twiddle(r9, 8);
r9=unzip4v2ph(r9, r11);
r9=unzip4v2pl(r9, r13);
t4=twiddle(r13, 4);
t4=zip4v2pl(r11, t4);
r7=zip2v4pl(r7, t4);
r11=twiddle(r11, 4);
r13=twiddle(r13, 0xc);
r11=zip4v2ph(r11, r12);
r13=zip4v2pl(r13, r15);
r11=twiddle(r11, 8);
r11=zip2v4pl(r11, r13);
r8=t2;
r14=roll6(r14, r14);
t4=twiddle(r15, 0xc);
r12=zip4v2ph(r12, t4);
r12=zip2v4pl(r12, r14);
r12=roll2(r12, r12);
r13=twiddle(r12, 0xc);
r15=zip2v4ph(r14, r15);
r14=t3;
r12=t1;
```

To encode or decode a 16×16 macroblock of an image in 4:2:0 format the two coded procedures set out above can be used six times, once for each of the four 8×8 luminance arrays and once each for the U and V chrominance arrays.

In the video compression field the computer and the methods described above could advantageously be used in any appropriate apparatus for compressing and/or decompressing video data. Examples are video cameras, video storage and/or playback units, video recorders, video transmission units, video telephones, personal computers, data transmission units (for instance cellular telephone base-stations and data network apparatus such as internet apparatus), monitors, televisions and set-top boxes. For example, FIG. 22 shows a suitable architecture for a set-top box 301 using such a computer. The set-top box receives a compressed video data feed 302, for example from an internet or a pay-to-view connection. The computer described above, at 303, programmed with the decompression code set out above which it holds in memory 22, decompresses the compressed video data into a pixel format. The PAL/NTSC converter 304 converts the pixel data to PAL or NTSC format and this is output to the television 305.

The computer and the methods described above could advantageously be applied to other situations in which there is a need to reorder sequences of data objects, for example matrix inversion.

The present invention may include any feature or combination of features disclosed herein either implicitly or explicitly or any generalisation thereof irrespective of whether it relates to the presently claimed invention. In view of the foregoing description it will be evident to a person skilled in the art that various modifications may be made within the scope of the invention.

The invention claimed is:

1. A method of reordering a matrix for input into a compression algorithm, the matrix comprising a plurality of input data values that represent video data, the method comprising:
    loading the data values into a computer storage by forming a plurality of data strings each data string comprising a plurality of data sub-strings and each data sub-string representing at least one of the data values, and storing each data string in a register of the computer storage in which the sub-strings of the data string are not individually addressable; and executing a series of distinct data reordering instructions to perform a series of data reordering steps operating on one or more of said data strings to reorder said data values;

the reordering operation being a scan-wise reordering operation, which involves producing a series of output sub-strings ordered according to a scan-wise pattern such that a scan involves selecting adjacent sub-strings in the matrix in order, wherein the scan is a diagonal scan.

2. A method as claimed in claim 1, wherein each data register has a predetermined bit capacity.

3. A method as claimed in claim 1, wherein the computer store has a predetermined bit capacity.

4. A method as claimed in claim 1, wherein each sub-string is at least two bits long.

5. A method as claimed in claim 1, wherein the data reordering instructions include at least one instruction to operate on two input data strings to form a data string in which adjacent sub-strings are equal to sub-strings of alternate ones of the input data strings.

6. A method as claimed in claim 5, wherein the said instruction forms an output data string in which two or more of the sub-strings are in order according to the scan-wise reordering operation.

7. A method as claimed in claim 1, wherein said data reordering steps are performed to generate a plurality of output data strings, each output data string comprising a plurality of output data sub-strings and each output data sub-string representing at least one of the data values, all the data values in the output strings being in order according to the scan-wise reordering operation.

8. A method as claimed in claim 1, including the step of forming an intermediate data string comprising a plurality of data sub-strings each representing at least one of the data values, only some of the data values in the intermediate data string being in order according to the scan-wise reordering operation.

9. A method as claimed in claim 1, wherein the scan is a zig-zag scan.

10. A method as claimed in claim 9, wherein the scan is a forward zig-zag scan.

11. A method as claimed in claim 9, wherein the scan is a reverse zig-zag scan.

12. A method as claimed in claim 1, wherein the data values represent luminance or chrominance data.

13. A computer comprising:
a processor;
data memory comprising registers to store data strings, each data string comprising a plurality of data sub-strings, such that the sub-strings are not individually addressable; and
program memory to store a set of distinct instructions for the processor to perform scan-wise reordering of a series of data values, loaded into said data sub-strings, the instructions including data reordering instructions to operate on one or more of said data strings to reorder the data values stored therein for input into a compression algorithm, wherein the scan-wise reordering involves producing a series of output sub-strings ordered according to a scan-wise pattern such that a scan involves selecting adjacent sub-strings in the matrix in order, and wherein the scan is a diagonal scan.

14. A computer as claimed in claim 13, wherein the data reordering instructions include at least one instruction to operate on two input data strings to form a data string in which adjacent sub-strings are equal to sub-strings of alternate ones of the input data strings.

15. A computer as claimed in claim 14, wherein the processor includes a dedicated unit to perform the said at least one instruction.

16. The computer recited in claim 13, wherein the set of instructions includes at least two different types of data reordering instructions from a group comprising: shuffle, sort, transpose, twiddle, and roll.

17. A computer comprising:
a processor;
data memory comprising registers to store data strings, each data string comprising a plurality of data sub-strings, such that the sub-strings are not individually addressable; and
program memory to store a set of distinct instructions for the processor to perform scan-wise reordering of a series of data values loaded into said data sub-strings, the instructions including data reordering instructions to operate on one or more of said data strings to reorder the data values stored therein,
wherein the processor includes at least one dedicated unit to perform at least one of the data reordering instructions, wherein the scan-wise reordering involves producing a series of output sub-strings ordered according to a scan-wise pattern such that a scan involves selecting adjacent sub-strings in the matrix in order, and wherein the scan is a diagonal scan.

18. The computer of claim 17, wherein the data reordering instructions include at
least one instruction from a group comprising: zip, un-zip, flip, twiddle, and roll, and
wherein the at least one dedicated unit includes a first dedicated unit to perform the at least one instruction.

19. The computer of claim 17, wherein the data reordering instructions include at least a first instruction to operate on two input data strings to form a data string in which adjacent sub-strings are equal to sub-strings of alternate ones of the input data strings,
wherein the at least one dedicated unit includes a first dedicated unit to perform the at least first instruction.

20. The computer of claim 19, wherein the data reordering instructions include at least two different instructions from the group comprising: zip, un-zip, flip, twiddle and roll.

21. A method of performing part of a compression-related operation, the method comprising:
receiving a plurality of data strings, each data string comprising a plurality of data sub-strings, each data sub-string representing at least one data value of video data, each data string being received with all its data sub-strings, the data sub-strings not being individually addressable; and
performing a scan-wise reordering operation on at least one of the data strings, comprising executing a series of distinct data reordering instructions to implement a series of data reordering steps to reorder the plurality of data sub-strings of the at least one data string, wherein the scan-wise reordering operation involves producing a series of output sub-strings ordered according to a scan-wise pattern such that a scan involves selecting adjacent sub-strings in the matrix in order, and wherein the scan is a diagonal scan.

22. The method of claim 21, further comprising:
accessing the series of data reordering instructions from a program memory.

23. The method of claim 21, wherein the executing of a series of data reordering instructions comprises performing at least one type of data reordering instruction from a group comprising: zip, un-zip, flip, twiddle, and roll.

24. The method of claim 23, wherein the executing of a series of data reordering instructions includes performing at least two types of data reordering instructions from a group comprising: zip, un-zip, flip, twiddle and roll.

25. The method of claim 21, wherein performing the scan-wise reordering operation comprises performing a zig-zag scan.

26. The method of claim 21, wherein the data values of each sub-string represent luminance or chrominance information.

27. The method of claim 21, wherein the compression-related operation is video compression or video decompression.

28. The method of claim 21, wherein the executing of a series of data reordering instructions includes using at least one processing unit dedicated to performing at least one data reordering operation.

* * * * *

UNITED STATES PATENT AND TRADEMARK OFFICE
CERTIFICATE OF CORRECTION

| | | |
|---|---|---|
| PATENT NO. | : 7,391,909 B2 | Page 1 of 1 |
| APPLICATION NO. | : 10/159954 | |
| DATED | : June 24, 2008 | |
| INVENTOR(S) | : Victor Robert Watson | |

It is certified that error appears in the above-identified patent and that said Letters Patent is hereby corrected as shown below:

On the title page, item 73 should be blank.

Signed and Sealed this
Eleventh Day of September, 2012

David J. Kappos
*Director of the United States Patent and Trademark Office*